C. J. GAUSS.
CLOTHES REEL.
APPLICATION FILED SEPT. 3, 1915.
1,220,215.
Patented Mar. 27, 1917.
2 SHEETS—SHEET 1.
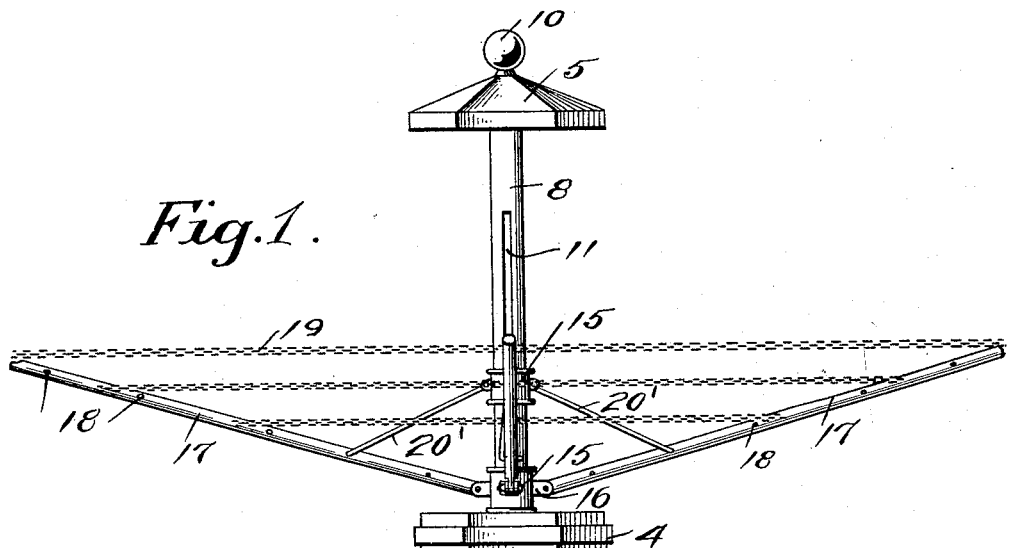
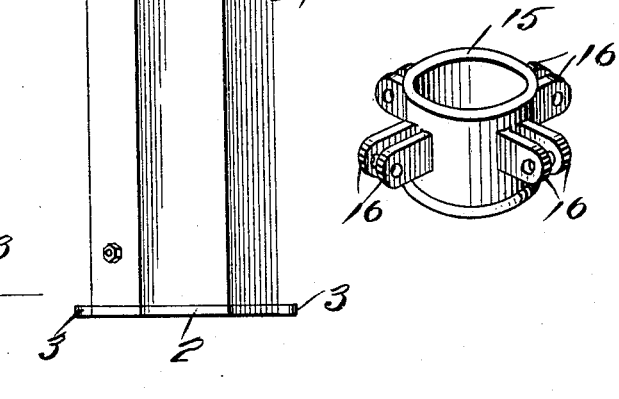
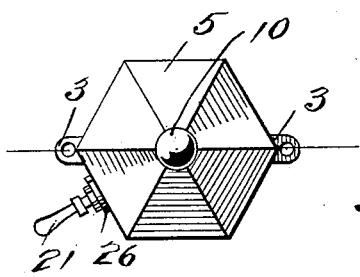
WITNESSES
Robert C. Kowell
B. F. Garvey Jr.
INVENTOR
Charles J. Gauss,
BY Richard Owen,
ATTORNEY

C. J. GAUSS.
CLOTHES REEL.
APPLICATION FILED SEPT. 3, 1915.

1,220,215.

Patented Mar. 27, 1917.
2 SHEETS—SHEET 2.

WITNESSES
Robert C. Kidwell
B. J. Garvey Jr.

INVENTOR
Charles J. Gauss,
BY Richard Owen,
ATTORNEY

UNITED STATES PATENT OFFICE.

CHARLES J. GAUSS, OF DULUTH, MINNESOTA.

CLOTHES-REEL.

1,220,215.  Specification of Letters Patent.  Patented Mar. 27, 1917.

Application filed September 3, 1915. Serial No. 48,902.

*To all whom it may concern:*

Be it known that I, CHARLES J. GAUSS, a citizen of the United States, residing at Duluth, in the county of St. Louis and State of Minnesota, have invented certain new and useful Improvements in Clothes-Reels, of which the following is a specification.

This invention relates to clothes reels and has primarily for its object to provide a collapsible clothes reel, which when folded, will automatically house itself to be protected from the inclemencies of the weather, and to occupy a minimum amount of space.

Another object of the invention is to provide a manually operable device, which may be converted, at the option of the user, by a simple operation of a hand-crank to assume an operative or inoperative position.

Other objects as well as the nature, characteristic features and scope of my invention will be more readily understood from the following description taken in connection with the accompanying drawings and pointed out in the claims forming a part of this specification.

Referring to the drawings:

Figure 1 is a side elevational view of a clothes reel constructed in accordance with my invention, the latter being shown in an operative position, Fig. 3 is a top plan view of the reel, when in a closed position, Fig. 4 is a perspective view of the reel-arm supporting sleeve.

Figure 5:
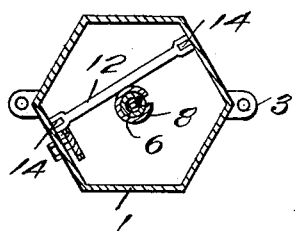
Fig. 5 is a horizontal sectional view of the device.

In the drawings, a housing 1 is provided which in this instance is of a polygonal configuration, the body of which is preferably formed of metal, and has engaged with the lower margin thereof, a base 2, made of wood, the latter having portions 3 projected therefrom to provide securing ears.

An annular flange 4 is formed on the outer periphery of the housing 1, adjacent the upper terminal of the latter, to provide an abutment to limit the downward movement of a closure 5, the latter in this instance being of a conical contour, so as to facilitate shedding of rain, etc., therefrom.

Detachably mounted upon the inner face of the base 2, is a tube 6 which is concentrically arranged within the housing 1 and is split from its upper terminal to a point in close proximity to its base. The base of said tube is closed, as shown to advantage in Fig. 2, and is engaged by a screw 7, the latter extending through the base 2 of the receptacle, whereby to permit said tube to be disengaged from the housing when so desired.

A tube 8 is sleeved upon the tube 6, the upper terminal of said tube 8 being closed and being engaged by the threaded shank 9 of a knob 10, which is detachably mounted in the closure 5. The tube 8 is provided with an elongated longitudinally extending slit 11 therein which extends through the lower terminal of the tube, the latter being fixedly engaged with a cross bar 12. The opposite ends of the bar 12 are bifurcated, as indicated at 13, to provide guides for engagement on the ribs or tracks 14, the latter being arranged at diametrically opposite points on the inner periphery of the housing 1. The ribs 14 extend from the base 2 of the housing to the upper terminal of the latter, as illustrated to advantage in Fig. 2, and will preclude possibility of the bar 12 from rotating when actuated within the housing 1.

Figures 2, 6:
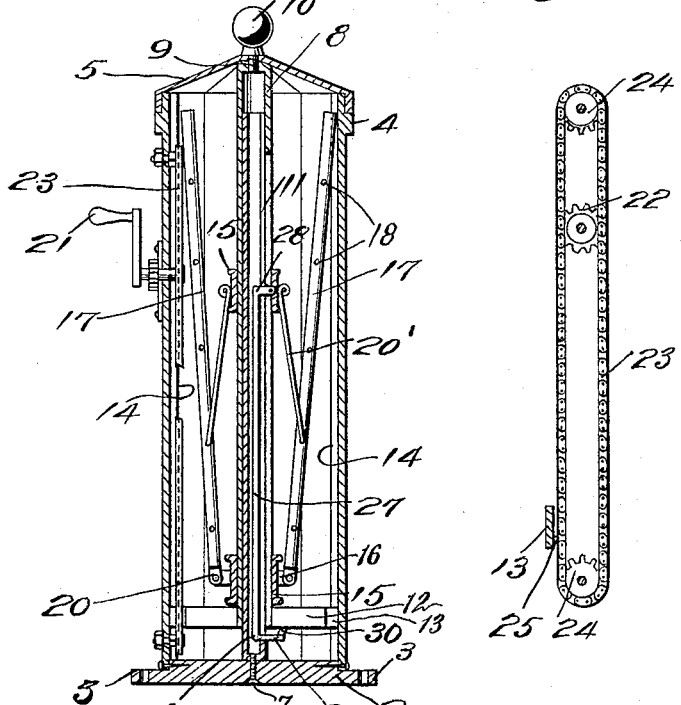
Fig. 2 is a longitudinal sectional view of the same, showing the device in an inoperative position.
Fig. 6 is a side elevational view of the sprocket chain used in the present invention, by which the reel arms are elevated, showing the manner of connection between the sprocket chain and said reel arms.
Figure 7:
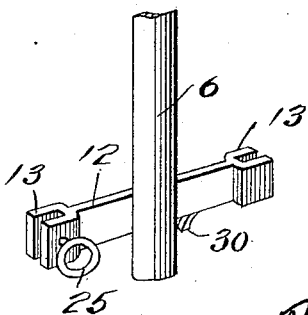
Fig. 7 is a detail enlarged perspective view of the means connecting the reel arms and sprocket chain, and also the guiding means.

The reel mechanism *per se* embodies a pair of sleeves 15 which are arranged in superposed relation upon the tube 8, and are slidable thereon. The lower of said sleeves is equipped on its outer periphery with a plurality of ears 16 which are arranged in pairs and are provided with corresponding apertures therein. Reel arms 17 are adapted for pivotal association with the ears 16, each of said arms being slightly shorter than the length of the housing 1, so as to be accommodated therein, when the reel is in a closed position, as indicated in Fig. 2. The arms may be of any desired configuration and are provided therein with apertures 18, through which cables may be passed if desired for supporting clothes thereon. In Fig. 1, chains 19 have been shown as associated with the reel arms, in order to illustrate the application of a supporting medium for the clothes. Each of the arms has its inner terminal reduced, as indicated at 20, and pivotally mounted between a pair of ears 16 on the lower of the sleeves 15, thereby permitting said arms to automatically gravitate when the tube 8 is elevated. The movement of the arms 17 in a downward plane is limited in view of a plurality of link members 20', each of the latter in this instance comprising a single rod, one end of which is loosely secured to a suitable axis on the outer periphery of the upper of said sleeves 15, while the lower end of each is in pivotal engagement with one of the arms 17, adjacent the lower terminal of the latter.

The reel mechanism is actuated by a hand-crank 21, said crank being in connection with a sprocket-wheel 22, the latter having trained thereover, a sprocket chain 23, as illustrated to advantage in Fig. 6. The sprocket chain 23 is likewise trained over a pair of sprocket wheels 24, the latter being mounted upon the inner periphery of the housing 1, adjacent the opposite ends of the latter. As shown to advantage in Fig. 6, one of the bifurcated ends of the bar 12 is equipped with a ring member 25, which is engaged through one of the links in the sprocket chain 23, thereby causing said bar 12 to be elevated upon the tube 6 when pressure is exerted upon the crank 21. The reel may be held in any position desired, in view of a pawl and ratchet mechanism 26, which is mounted on the outer periphery of the housing 1 and is associated with the crank 21.

A trip rod 27 is mounted upon the interior of the tube 6, one end 28 thereof being turned at right angles to the body and having its free terminal in pivotal engagement with the inner periphery of the sleeve 15. The opposite end is turned into parallelism with the right-angled portion 28, as indicated at 29, the free terminal of the latter being extended appreciably beyond the free terminal of the right-angled portion 28 and lying in the path of a finger 30, which depends from the lower marginal edge of the bar 12. The trip rod, as will be appreciated, is a secondary mover for the arm 17, in order to collapse the same, to permit association of the same with the housing 1. The prime mover, as will be appreciated, is the crank 21, which when actuated will cause pressure to be exerted upon the bar 12, assuming that it is desired to close the clothes reel, thereby imparting movement to the arm 17, so as to relatively move the latter, to conform substantially to the size of the housing 1, to permit of their being expeditiously introduced into the latter. As soon as the bar 12 has moved a predetermined distance downwardly upon the tube 8, when the clothes reel is in an open position, as shown in Fig. 1, contact will be made between the finger 30 and the right-angled terminal 29 of the trip-rod 27, causing pressure to be exerted on the latter for pulling the sleeve 15 downwardly on the tube 8, incidentally intercommunicating motion to the rods 20, for relatively moving the arm 17.

In operation, therefore assuming that the device is in a closed position, as shown in Fig. 2, and it is desired to elevate the clothes reel, pressure is exerted upon the crank 21 in one direction, which as will be appreciated will impart movement to the sprocket chain 23, incidentally elevating the tube 8, in conjunction with the closure 9 which is carried by the tube. As previously stated, the arm 17 may be held in any desired position, although the complete phase of movement of the arms is that as shown in Fig. 1, since further movement is prohibited, in view of the rods 20'. The arm 17 will, of course, gravitate just as soon as the tube 8 reaches a predetermined position, above the housing 1. When it is desired to close the reel, pressure is exerted upon the crank 21 in a counter direction to that first mentioned, which will impart movement to the sprocket chain 23 in a counter direction, thereby operating the tube 8 downwardly, which after having moved a certain distance will contact with the trip rod 27, to force the upper of said sleeves 15 downwardly toward the lower of said sleeves, thereby relatively moving said arms 17.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

Having thus fully described my invention, what I claim as new and desire to secure by Letters Patent is:

1. A clothes reel including a housing, a slotted tube arranged centrally therein, a second slotted tube slidably mounted on the first, a reel mechanism operable within the housing, a tripping mechanism mounted within the tubes, and means for operating the reel mechanism.

2. A clothes reel including a housing, a telescopic tube having registering slots arranged centrally therein, sliding collars mounted on the outer member of the tube, a cross bar fixedly secured to the said outer member, a finger depending from said bar, a trip rod mounted within the tube and having its upper end secured to the uppermost collar and having its lower end projecting through the slot for engagement with the finger, a reel mechanism operable within the housing and associated with the collars, and means for operating the mechanism.

3. A clothes reel including a housing, a slotted telescopic tube centrally arranged therein, a reel mechanism operable within the housing, a tripping means mounted in the tube and associated with the mechanism, a closure for said housing carried by one section of the tube, and means for operating the reel mechanism.

4. A clothes reel including a housing, guides within the housing, a telescopic tube, a reel mechanism associated with the tube, a cross bar secured to one section of the tube, said bar having its ends yoked to receive the guides, a trip bar operated by the cross bar, and means imparting movement to the cross bar.

5. A clothes reel including a housing, a slotted telescopic tube centrally arranged therein, sleeves slidably carried by the tube, arms pivoted to one of said sleeves, brace rods pivoted to the other of said sleeves and connected to the arms, a trip rod secured to the said second sleeve, a cross bar secured to the tube, said bar operating the arms in its upward and the trip rod in its downward movement, and means for imparting movement to the cross bar.

In testimony whereof I affix my signature in presence of two witnesses.

CHARLES J. GAUSS.

Witnesses:
H. W. ANDREDGE,
JOHN GONSKA.

Copies of this patent may be obtained for five cents each, by addressing the "Commissioner of Patents, Washington, D. C."